(12) United States Patent
O'Leary et al.

(10) Patent No.: US 9,306,232 B2
(45) Date of Patent: Apr. 5, 2016

(54) IN SITU FUEL CELL CONTAMINATION SAMPLING DEVICE

(75) Inventors: Kelly O'Leary, Rochester, NY (US); Sean Mackinnon, Fairport, NY (US); Michael Budinski, Pittsford, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 1858 days.

(21) Appl. No.: 12/145,767

(22) Filed: Jun. 25, 2008

(65) Prior Publication Data

US 2009/0325019 A1 Dec. 31, 2009

(51) Int. Cl.
*H01M 8/10* (2006.01)
*B01D 39/00* (2006.01)
*H01M 8/06* (2006.01)

(52) U.S. Cl.
CPC .... *H01M 8/0687* (2013.01); *H01M 2008/1095* (2013.01); *Y02E 60/50* (2013.01)

(58) Field of Classification Search
CPC .................................................. H01M 8/0687
USPC ........................................................ 429/479
See application file for complete search history.

(56) References Cited

U.S. PATENT DOCUMENTS

| 3,538,020 | A | * | 11/1970 | Heskett et al. ................. 210/496 |
| 6,171,551 | B1 | * | 1/2001 | Malchesky et al. .............. 422/29 |
| 6,475,386 | B1 | * | 11/2002 | Carr et al. ..................... 210/266 |
| 2001/0049037 | A1 | | 12/2001 | St-Pierre et al. |
| 2002/0189457 | A1 | | 12/2002 | Dallas et al. |
| 2003/0140785 | A1 | * | 7/2003 | Koslow ............................. 95/90 |
| 2006/0257707 | A1 | * | 11/2006 | Kaschmitter et al. ........... 429/34 |
| 2006/0292426 | A1 | * | 12/2006 | Stenersen et al. ............... 429/34 |
| 2008/0179177 | A1 | * | 7/2008 | Cha .......................... 204/157.43 |
| 2009/0040690 | A1 | * | 2/2009 | Yasuda ......................... 361/525 |
| 2009/0227059 | A1 | * | 9/2009 | Besnard et al. ................ 438/49 |

FOREIGN PATENT DOCUMENTS

| CN | 1474712 | | 2/2004 |
| CN | 101061007 A | | 10/2007 |
| WO | WO2006004016 | * | 12/2006 |

OTHER PUBLICATIONS

Mahle et al., "Report on Immobilized Filters for Air Filtration", 2002.*

* cited by examiner

*Primary Examiner* — Ladan Mohaddes
(74) *Attorney, Agent, or Firm* — Fraser Clemens Martin & Miller LLC; James D. Miller

(57) ABSTRACT

A filtration device for a fuel cell system is provided. The filtration device includes a filter adapted to receive a reactant for a fuel cell. The filter includes a molecular sieve material adapted to separate a contaminant from the reactant supplied to the fuel cell. A membrane electrode assembly having the filter integrally formed therewith, and a fuel cell stack having the filter disposed adjacent at least one of the end plates of the fuel cell stack, are also provided.

20 Claims, 3 Drawing Sheets

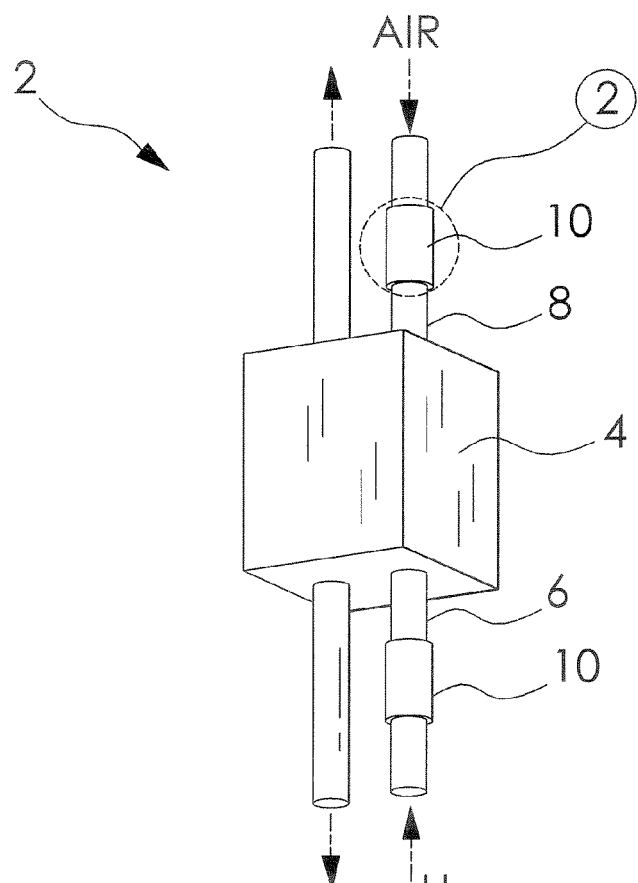
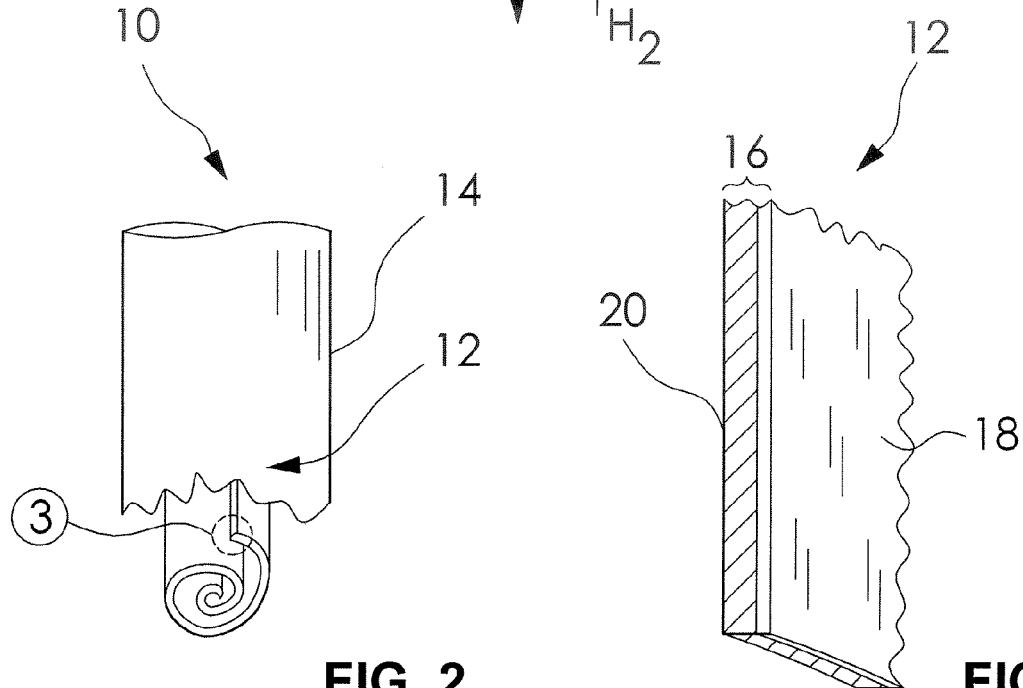
FIG. 1
FIG. 2
FIG. 3

IN SITU FUEL CELL CONTAMINATION SAMPLING DEVICE

FIELD OF THE INVENTION

The present disclosure relates to a fuel cell system and, more particularly, to a device for filtration and contamination testing in a fuel cell system.

BACKGROUND OF THE INVENTION

A fuel cell has been proposed as a clean, efficient and environmentally responsible power source for electric vehicles and various other applications. In particular, the fuel cell has been identified as a potential alternative for the traditional internal-combustion engine used in modern automobiles.

One type of fuel cell is the polymer electrolyte membrane (PEM) fuel cell. The PEM fuel cell includes three basic components: a cathode; an anode; and an electrolyte membrane. The cathode and anode are generally formed from a finely divided catalyst, such as comminuted platinum. The electrolyte membrane is sandwiched between the cathode and the anode to form a membrane-electrode-assembly (MEA). The MEA is typically disposed between porous diffusion media (DM), such as carbon fiber paper, which facilitates a delivery of reactants such as hydrogen to the anode and oxygen to the cathode. The hydrogen is catalytically disassociated in the anode to generate free protons and electrons. The electrons from the anode cannot pass through the electrolyte membrane, and are instead directed through an electric load to perform work before being sent to the cathode. The protons pass through the electrolyte to the cathode. The protons react with the oxygen and the electrons in the cathode to generate water. Individual fuel cells can be stacked together in series to form a fuel cell stack. The fuel cell stack is capable of supplying a quantity of electricity sufficient to power a vehicle.

Contamination of the electrolyte membrane after prolonged periods of use is known to affect the performance and durability of the PEM fuel cell. Typical contaminants may include pollutants from air drawn from the atmosphere as well as internal sources. Contaminants and errant chemical species may leach or migrate from fuel cell components, such as adhesives, seals, and the like, that can gradually break down over the lifetime of the fuel cell.

It has been difficult to sufficiently assess PEM fuel cell contamination. In particular, the determination of contaminant type and quantity has been made difficult by the presence of the platinum catalyst in the MEA interfering with traditional analytical techniques. Additionally, although it is known to use air filters in fuel cell systems to scrub the cathode air supply, conventional air filters do not sufficiently remove the contaminants which may negatively affect the PEM fuel cell stack performance and the useful lifetime of the PEM fuel cell stack.

There is a continuing need for a device that sufficiently filters contaminants and errant species from the reactant streams of the fuel cell stack. Desirably, the device facilitates an analysis of the types and quantities of contaminants and errant species present at the electrolyte membrane of the fuel cell stack.

SUMMARY OF THE INVENTION

In concordance with the instant disclosure, a device that sufficiently filters contaminants and errant species from the reactant streams of the fuel cell stack, and that facilitates an analysis of the types and quantities of contaminants and errant species present at the MEA of the fuel cell stack, is surprisingly discovered.

In one embodiment, a filtration device for a fuel cell system includes a filter adapted to receive a reactant for a fuel cell. The filter includes a molecular sieve material adapted to separate a contaminant from the reactant. The molecular sieve militates against electrode contamination. The filter also may include an ionomer substrate to filter potential contaminants that may affect the electrolytic membrane, for example, by effectively scrubbing ions from the reactant.

In another embodiment, a membrane electrode assembly for a fuel cell includes an electrolyte membrane disposed between a pair of electrodes. The electrolyte membrane with the electrodes forms an active area of the membrane electrode assembly for the electrochemical fuel cell reaction. A barrier film is coupled to the electrolyte membrane and forms a header area of the membrane electrode assembly. A filter is disposed on the barrier film and forms a witness area of the membrane electrode assembly. The filter including a molecular sieve material adapted to separate a contaminant from a reactant.

In a further embodiment, a fuel cell stack includes a pair of end plates with a plurality of fuel cells disposed therebetween. Each fuel cell has a MEA disposed between gas diffusion media and bipolar plates. The end plates confine the electrically active portion of the fuel cell stack. At least one filter is disposed adjacent the end plates of the fuel cell stack. The filter is in fluid communication with an inlet for the reactant disposed in a manifold. The filter includes a molecular sieve material. The filter may further include an ion exchange resin as a separate layer or a binder, the ion exchange resin adapted to separate ions from the reactant.

DRAWINGS

The above, as well as other advantages of the present disclosure, will become readily apparent to those skilled in the art from the following detailed description, particularly when considered in the light of the drawings described herein.

FIG. 1 is a schematic, perspective view of a PEM fuel cell stack, showing the fuel cell stack in fluid communication with a filtration device according to the present disclosure;

FIG. 2 is an enlarged, fragmentary side elevational view of the filtration device illustrated in FIG. 1, showing the filtration device disposed in a housing;

FIG. 3 is an enlarged, fragmentary perspective view of the filtration device illustrated in FIG. 2, showing a filtration medium disposed on an ionomer substrate;

Figure 4:
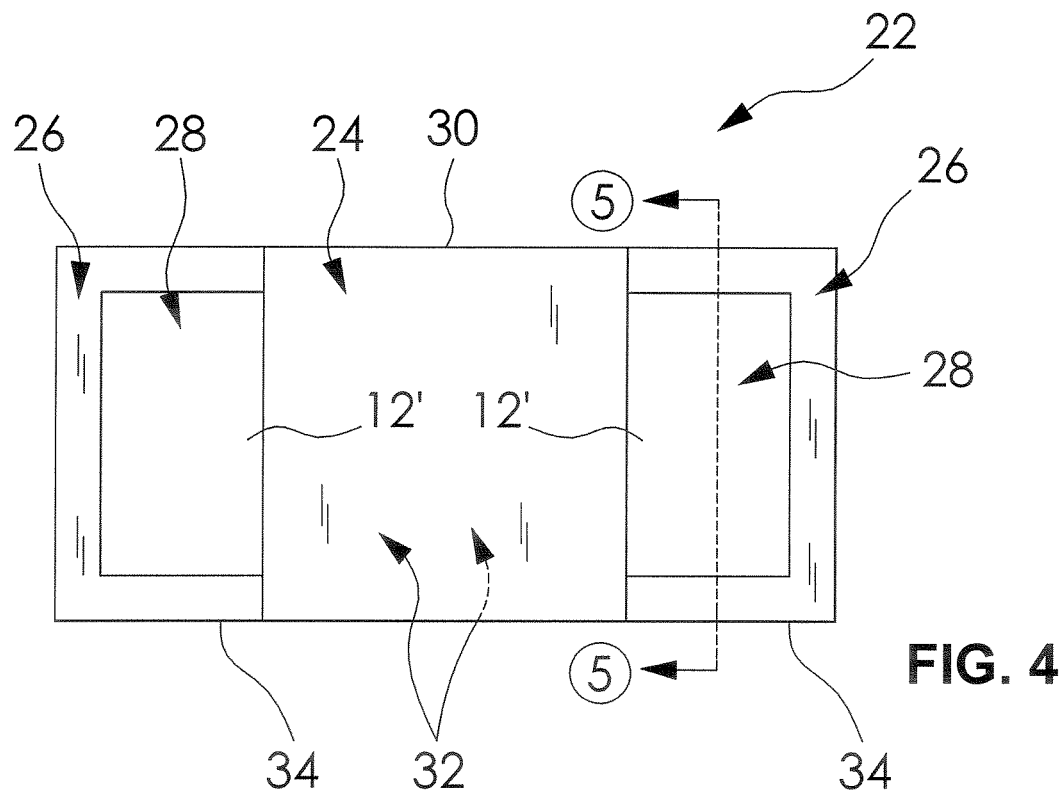
FIG. 4 is a top plan view of a membrane-electrode assembly (MEA) according to the present disclosure, the MEA having a header region and a filtration region for reactant flow.
Figure 5:
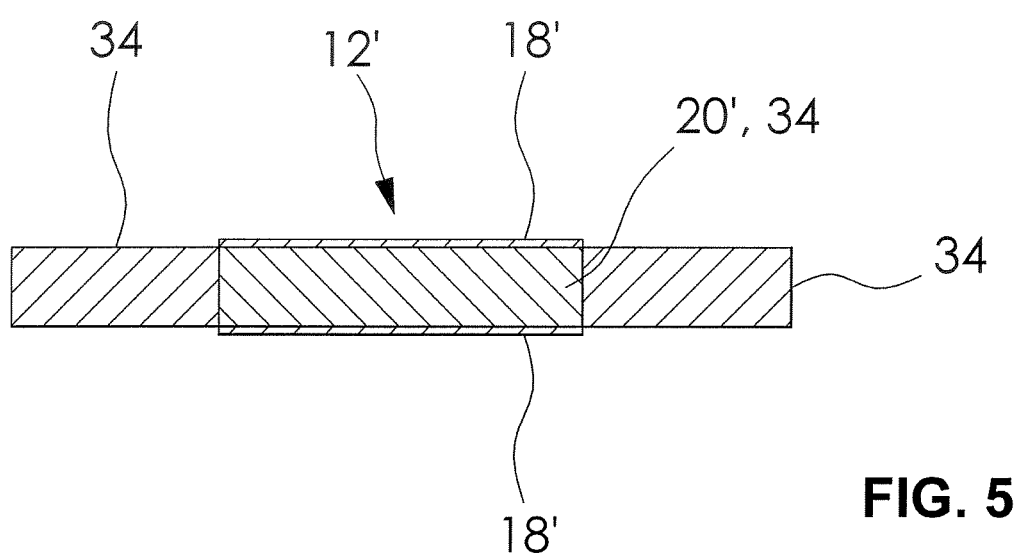
Figure 6:
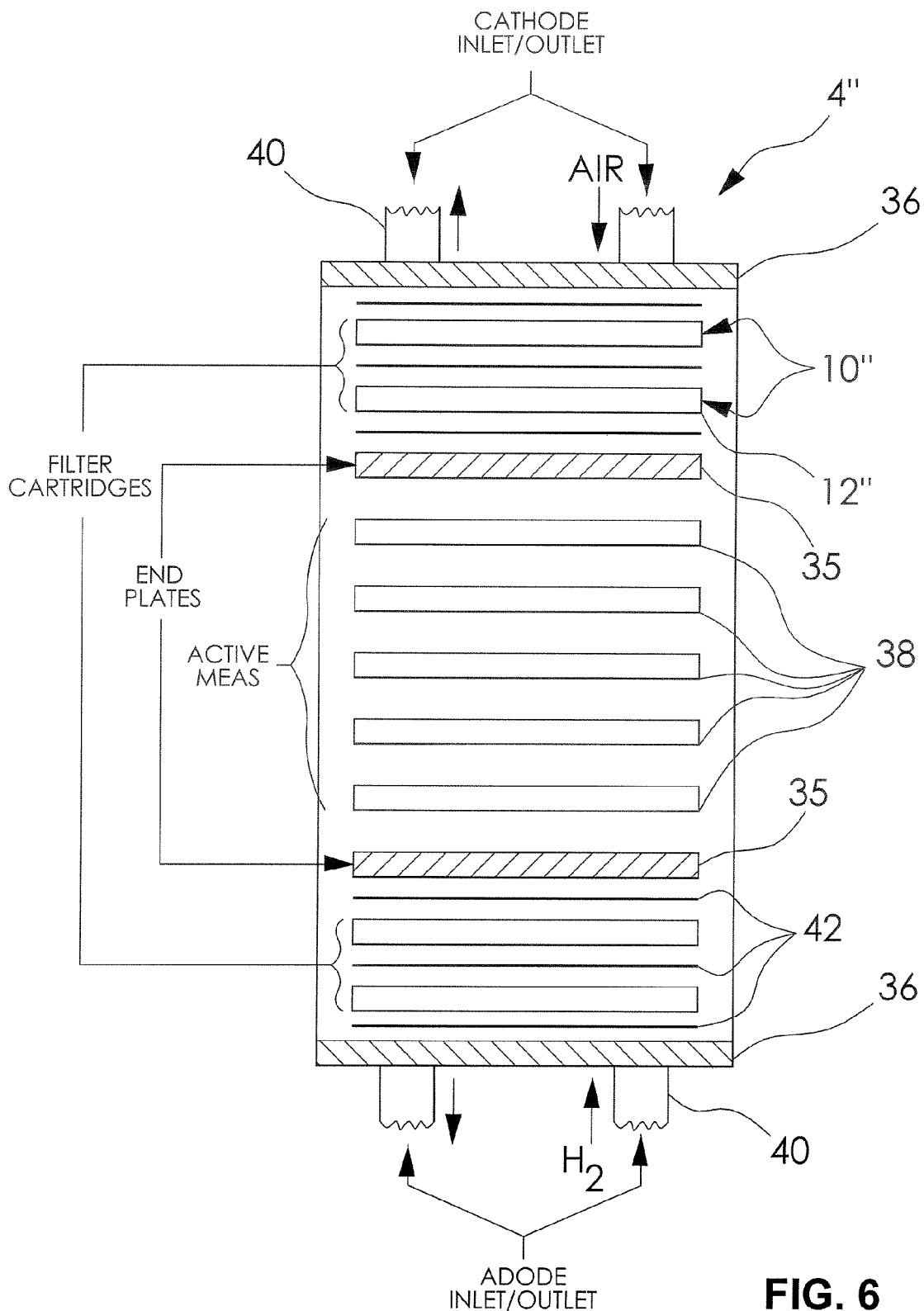

FIG. 5 is a cross-sectional view taken along line 5-5 of the MEA depicted in FIG. 4, showing a filtration medium disposed on an impermeable polymeric substrate; and FIG. 6 is a schematic, side cross-sectional view of a fuel cell stack with a plurality of fuel cells in fluid communication with inlets and outlets for reactants, filtration devices according to the present disclosure disposed between the inlets and outlets and end plates.

DETAILED DESCRIPTION OF THE INVENTION

The following description is merely exemplary in nature and is not intended to limit the present disclosure, application, or uses. It should also be understood that throughout the drawings, corresponding reference numerals indicate like or corresponding parts and features.

FIG. 1 depicts a fuel cell system 2 having a fuel cell stack 4 in fluid communication with an anode supply conduit 6 and a cathode supply conduit 8 for delivering reactants to the fuel cell stack 4. The fuel cell stack 4 includes a plurality of fuel cells. Each fuel cell includes an electrolyte membrane disposed between an anode and a cathode. The reactant supplied to the anodes is generally hydrogen gas. The reactant supplied to the cathodes is generally compressed air. In certain embodiments, the fuel cell stack 4 is substantially the same as described in co-pending U.S. application Ser. No. 11/696,361, hereby incorporated herein by reference in its entirety. Other known fuel cell stack designs and configurations may also be employed with the invention according to the present disclosure.

The fuel cell system 2 includes at least one filtration device 10 adapted to separate a contaminant from the reactant supplied to the fuel cell stack 4. The filtration device 10 may be in fluid communication with at least one of the anode supply conduit 6 and the cathode supply conduit 8 as desired. The filtration device 10 may be disposed in line or in parallel with the supply conduits 6, 8. In particular embodiments, the filtration device 10 is readily removable from the fuel cell system 2, for example, to facilitate a testing and analysis of the filtration device 10 for contamination types and quantities. The filtration device 10 may be connected to the fuel cell system 2 with a quick connect coupling, for example. Other suitable means for readily removing the filtration device 10 from the fuel cell system 2 may be employed as desired.

With reference to FIG. 2, the filtration device 10 includes a filter 12 disposed in a housing 14. The housing 14 may be at least one of the supply conduits 6, 8. In other embodiments, the housing 14 is disposed as a separate and distinct component. The housing 14 may include a pair of fuel cell plates between which the filter 12 is disposed, for example. The filter 10 may be suspended in the housing 14 and configured to be easily removed for testing, as desired. The housing 14 is adapted for fluid communication with a fuel cell stack 4 and a source (not shown) of the reactant, such as a pressurized hydrogen tank or an air compressor.

The filter 12 according to the present disclosure includes a molecular sieve material. Suitable molecular sieve materials may include any material having pores of a size and structure sufficient to adsorb contaminants and errant chemical species from reactants supplied to the fuel cell stack 4. As nonlimiting examples, the molecular sieve material may include at least one of an aluminosilicate mineral, a clay, a porous glass, a microporous charcoal, a zeolite, an activated carbon, and multitype combinations thereof. In particular embodiments, the molecular sieve material is one of the activated carbon and the zeolite. A skilled artisan should appreciate that other suitable molecular sieve materials may also be employed as desired.

The filter 12 may further include a bonding agent employed to bind the molecular sieve material, typically provided in the form of a particulate, into a desired shape suitable for filtration of the reactant. For example, the molecular sieve material may be mixed with the bonding agent. Suitable bonding agents may include polymeric adhesives and the like. In one embodiment, the bonding agent is an ionomeric material. As a nonlimiting example, the bonding agent may be a Nafion® ionomer, commercially available from E.I. Dupont de Nemours & Co. Other ionomers suitable for use in the fuel cell may be employed as desired.

As shown in FIG. 3, the filter 12 may be a laminate 16 having a filtration layer 18 containing the molecular sieve material disposed on a substrate 20. For example, the molecular sieve material may be mixed with the bonding agent and deposited on the substrate 20 to form the filtration layer 18. The substrate 20 may be formed from one of a fluid permeable material and a fluid impermeable material as desired. In particular embodiments, the substrate 20 is an ionomer as described herein above. In other embodiments, the substrate 20 is formed from a gas diffusion medium, such as a graphite or carbon fiber paper typically employed in the fuel cell. A skilled artisan should understand that other suitable substrates 20 for the filter 12 may also be employed. It should be further appreciated that the ionomer may perform both as the substrate and as an additional filtration device for ionic membrane contaminants.

The laminate 16 may have other layered configurations as desired. For example, the laminate 16 may include a plurality of filtration layers 18. The plurality of filtration layers 18 may include first and second filtration layers 18 that sandwich the substrate 20. In particular nonlimiting examples, the laminate 16 may have at least one of the following layered configurations: the filtration layer 18 disposed on the ionomer substrate 20; the ionomer substrate 20 sandwiched between first and second filtration layers 18; the filtration layer 18 disposed on the diffusion media substrate 20; and the diffusion medium substrate 20 sandwiched between first and second filtration layers 18.

It should be appreciated that the filter 12 may be disposed or otherwise suspended in the housing 14 in a variety of configurations. In particular, the laminate 16 may be disposed in a substantially planar configuration within the housing 14. The filter 12 may comprise a plurality of the laminates 16 stacked adjacent one another within the housing 14. With renewed reference to FIG. 2, the filter 12 may include the laminate 16 coiled or rolled within the housing 14. A skilled artisan should appreciate that the coiled configuration may increase a quantity of available filter 12 surface area for separating the contaminant from the reactant. Other configurations of the laminate 16 sufficient for the filter 12 to separate the contaminant from the reactant for the fuel cell stack 4 may also be employed.

The filter 12 according to the present disclosure may further have a form other than the laminate 16. In one nonlimiting example, the filter 12 is an activated packed bed having the molecular sieve material. The activated packed bed of the molecular sieve material may be disposed in the housing 14 and be one of open-ended and closed-ended as desired to form the filtration device 10. The activated packed bed may include a plurality of polymeric beads. The polymeric beads may have the molecular sieve materials disposed thereon, for example. The polymeric beads may also be formed by mixing the molecular sieve material with the bonding agent. A skilled artisan may also select other known means for forming an activated packed bed as desired.

With reference to FIGS. 4 to 6, various embodiments according to the present invention are described. For purpose of clarity, like or related structures repeated from FIGS. 1 to 3 and found in FIGS. 4 to 6 have the same reference numerals and are denoted with a prime (') symbol or a double-prime (") symbol.

The present disclosure includes a membrane electrode assembly (MEA) 22 having an active area 24, a header area 26, and a filtration area 28. The MEA 22 includes an electrolyte membrane 30 disposed between a pair of electrodes 32. The electrolyte membrane 30 with the electrodes 32 forms the active area 24 of the MEA 22.

A barrier film 34 is coupled to the electrolyte membrane 30 and forms the header area 26 of the fuel cell. The barrier film 34 may be coupled with the electrolyte membrane 30 substantially as described in co-pending U.S. application Ser. No. 11/972,211, hereby incorporated herein by reference in its entirety, for example. Other suitable means for coupling the barrier film 34 with the electrolyte membrane 30 may also be employed, as desired.

The barrier film 34 is formed from a substantially impermeable material. For example, the barrier film 34 does not substantially swell or degrade with exposure to the reactants and other fuel cell system 2 fluids, such as coolant, oil, and grease. In particular, the barrier film 34 is formed from a material that is able to provide both electrical and mechanical separation and militate against an undesirably mixing of the different reactants supplied to the fuel cell stack 4. As non-limiting examples, the barrier film 34 may be formed from one of a polyvinylidene fluoride, a polypropylene, a polyethylene, a polyolefin, a PTFE, a polyaryl ethers, a PEEK, a polysulfone, a polyimide, an epoxy, a polyurethane, a nitrile, a butyl, a TPE polymer, and combinations thereof. Other materials substantially impermeable to the fuel cell reactants are also suitable and may be used as desired.

A filter 12' is formed by a deposition of a filtration layer 18' on the barrier film 34. The filter 12' forms the filtration area 28 of the MEA 22. The filtration layer 18' includes the molecular sieve material and is adapted to separate the contaminant from the reactant that flows across the barrier film 34 during operation of the fuel cell stack 4. One of ordinary skill should understand that the barrier film 34 in the MEA 22 may effectively be employed as the substrate 20' of the filter 12'. In certain embodiments, an intermediate substrate 20', such as an ionomeric layer, may be disposed between the filtration layer 18' and the barrier film 34. For example, the filter 12' configuration may include the barrier film 34 disposed between a pair of the permeable substrates 20', each permeable substrate 20' having the filtration layer 18' disposed thereon. In the embodiment shown in FIG. 4, the barrier film 34 is sandwiched by a pair of the filtration layers 18' to form the filter 12' integral with the MEA 22.

It should be appreciated that the filtration area 28 of the MEA 22 may form a "witness area" indicative of the level and type of contamination experienced by the active area 24 of the fuel cell. The MEA 22 having the filtration area 28 may be removed from the fuel cell stack 4 for testing and analysis, as desired.

As shown in FIG. 6, the present disclosure further includes the fuel cell stack 4" having at least one filtration device 10" internally disposed in the fuel cell stack 4". The fuel cell stack 4" includes a pair of end plates 35 with a plurality of fuel cells 38 disposed therebetween. The end plates 35 and the fuel cells 38 are generally disposed between a pair of manifolds 36 configured to deliver a reactant thereto. A least one of the manifolds 36 has an inlet 40 formed therein for delivery of the reactant, such as compressed air or hydrogen gas.

The filtration device 10" includes at least one filter 12" disposed adjacent at least one of the end plates 35. The filter 12" is in fluid communication with the inlet 40 for the reactant. The filter 12" includes the molecular sieve material as described hereinabove, and is adapted to separate the contaminant from the reactant prior to the reactant entering the plurality of fuel cells 38. In one example, the filter 12" may include the laminate 16 having the filtration layer 18 with the molecular sieve material and the substrate 20, substantially as described further hereinabove.

In a particular embodiment, the filter 12" is disposed between a pair of plates 42. The plates 42 may form the housing 14 of the filtration device 10". The filtration device 10" may be readily removable from the fuel cell stack 4", for example, as a cartridge that may be slid into and out of the fuel cell stack 4" for testing.

The filters 12, 12', 12" of the present disclosure are a means of both removing contaminants that may come into contact with the fuel cell stack 4, 4" as well as analyzing the contamination type on a non-catalytic surface. The filters 12, 12', 12" have advantageously been shown to capture contaminants in the reactants of the anode and cathode inlet streams that were otherwise undetected on MEAs in the fuel cell stack 4, 4". The filters 12, 12', 12" may further capture contaminants in the ionomer substrate that would otherwise effect the electrolyte membranes of the fuel cell stack 4, 4".

It should be appreciated that the filters 12, 12', 12" according to the present disclosure are applicable in both stationary and automotive fuel cell applications. The filters 12, 12', 12" are a means of filtering and sampling undesirable species from the fuel cell system. In particular, the device advantageously provides a means of filtering and sampling at either the reactant inlet or the reactant outlet, as desired. The filters 12, 12', 12" may further be employed to sample the surface of the electrolyte membrane via a witness area on the surface of the MEA. Advantageously, the filters 12, 12', 12" may be used in any conventional fuel cell system without significant increases in system costs or modifications to the overall fuel cell system design.

While certain representative embodiments and details have been shown for purposes of illustrating the invention, it will be apparent to those skilled in the art that various changes may be made without departing from the scope of the disclosure, which is further described in the following appended claims.

What is claimed is:

1. A filtration device for a fuel cell system, comprising:
a filter adapted to receive a reactant for a fuel cell, the filter including a molecular sieve material adapted to separate a contaminant from the reactant and a bonding agent in which the molecular sieve material is disposed, wherein the molecular sieve material is in the form of a particulate, the bonding agent binds the particulate, and the bonding agent comprises an ionomeric material.

2. The filtration device of claim 1, wherein the molecular sieve material is at least one of an aluminosilicate mineral, a clay, a porous glass, a microporous charcoal, a zeolite, an activated carbon, and a combination thereof.

3. The filtration device of claim 1, further comprising a housing in fluid communication with the fuel cell and a source of the reactant, the filter disposed in the housing.

4. The filtration device of claim 3, wherein the housing is one of an inlet conduit and an outlet conduit in fluid communication with the fuel cell.

5. The filtration device of claim 1, wherein the filter is a laminate of a filtration layer with the molecular sieve material and bonding agent disposed on a substrate.

6. The filtration device of claim 5, wherein the laminate is disposed in a substantially planar configuration in a housing.

7. The filtration device of claim 5, wherein the laminate is coiled in a housing.

8. The filtration device of claim 5, wherein the substrate is disposed between a first filtration layer and a second filtration layer.

9. The filtration device of claim 5, wherein the substrate is one of an ionomer substrate and a diffusion medium substrate.

10. The filtration device of claim 1, wherein the filter is an activated packed bed including the molecular sieve material.

11. The filtration device of claim 10, wherein the activated packed bed includes a plurality of polymeric beads having the molecular sieve material disposed thereon.

12. A filtration device for a fuel cell system, comprising:
a filter adapted to receive a reactant for a fuel cell, the filter including a molecular sieve material adapted to separate a contaminant from the reactant and a bonding agent in which the molecular sieve material is disposed, wherein the molecular sieve material is in the form of a particulate, the bonding agent binds the particulate, the filter is a laminate of a filtration layer with the molecular sieve material and bonding agent disposed on a substrate, and the substrate comprises a sulfonated tetrafluoroethylene based fluoropolymer-copolymer.

13. The filtration device of claim 5, wherein the substrate is a fluid permeable material.

14. The filtration device of claim 5, wherein the substrate is a fluid impermeable material.

15. The filtration device of claim 5, wherein the substrate is a graphite or carbon fiber paper.

16. A filtration device for a fuel cell system, comprising:
a filter adapted to receive a reactant for a fuel cell, the filter including a molecular sieve material adapted to separate a contaminant from the reactant and a bonding agent in which the molecular sieve material is disposed, wherein the molecular sieve material is in the form of a particulate, the bonding agent binds the particulate, the bonding agent comprises an ionomeric material and the ionomeric material comprises a sulfonated tetrafluoroethylene based fluoropolymer-copolymer.

17. The filtration device of claim 1, wherein the ionomeric material is configured to perform as an additional filtration device for ionic membrane contaminants.

18. The filtration device of claim 5, wherein the laminate comprises the substrate sandwiched between the filtration layer and a second filtration layer.

19. The filtration device of claim 10, wherein the activated packed bed includes a plurality of polymeric beads comprising a mixture of the molecular sieve material and the bonding agent.

20. The filtration device of claim 1, wherein the molecular sieve material comprises an aluminosilicate mineral and the bonding agent comprises a sulfonated tetrafluoroethylene based fluoropolymer-copolymer.

* * * * *